June 9, 1931.  F. E. HARTMAN  1,809,034
COLLAPSIBLE INCLOSURE FOR RUMBLE SEATS
Filed May 13, 1929  2 Sheets-Sheet 1
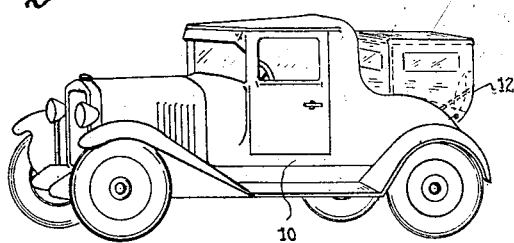
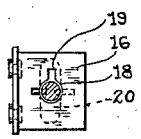
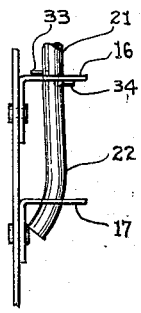
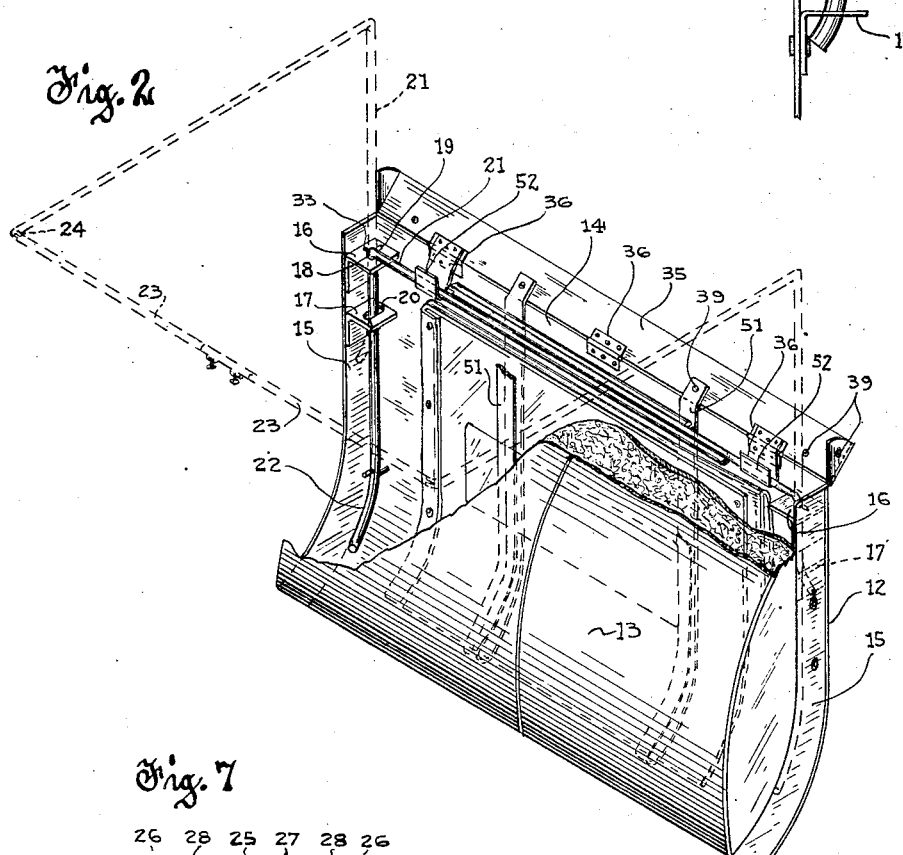
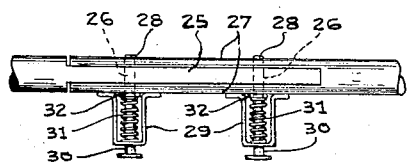
INVENTOR.
Frederick E. Hartman
BY
Morsell, Kenney, & Morsell
ATTORNEYS.

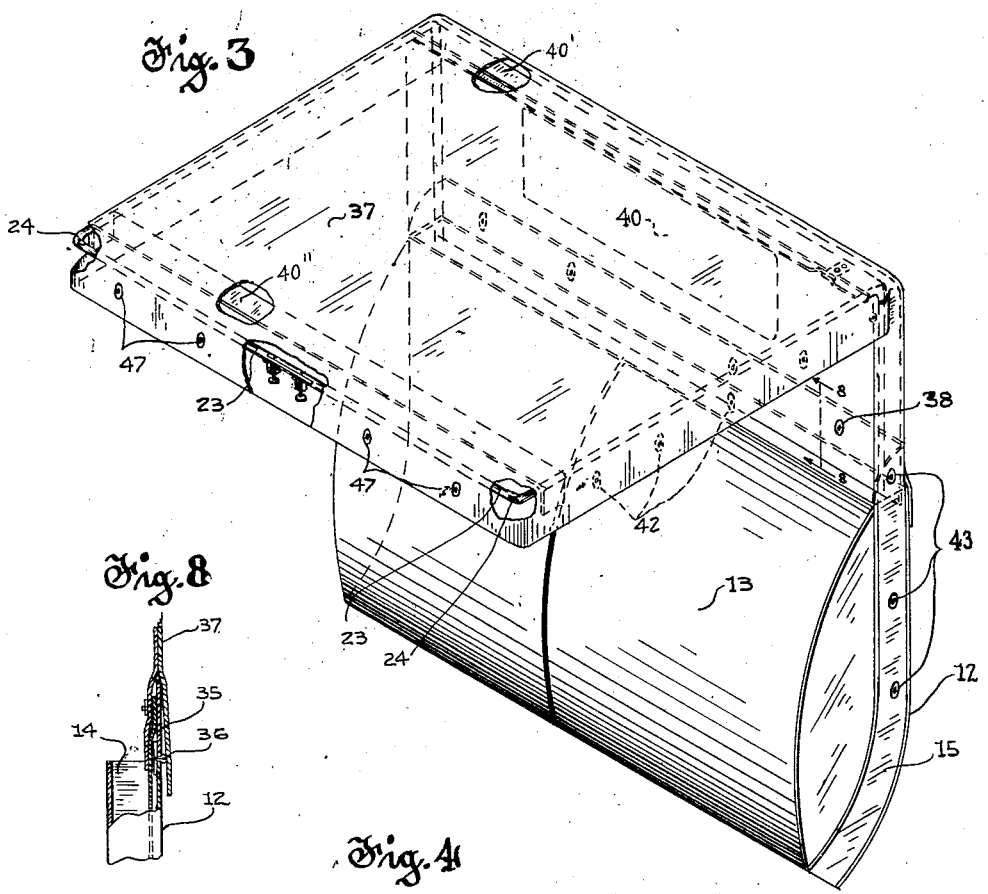
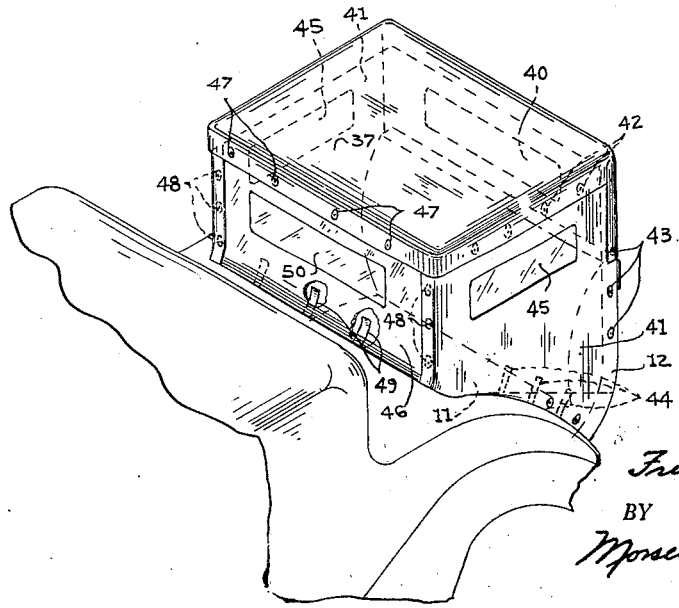

Patented June 9, 1931

1,809,034

UNITED STATES PATENT OFFICE

FREDERICK E. HARTMAN, OF MILWAUKEE, WISCONSIN

COLLAPSIBLE INCLOSURE FOR RUMBLE SEATS

Application filed May 13, 1929. Serial No. 362,608.

This invention relates to improvements in collapsible inclosures for rumble seats.

Heretofore, no provision has been made to shelter the occupants of rumble seats of automobiles, and as a result, the use of said seats has been more or less limited to summer days when the weather is fair. Even at such times, the occupants are in danger of being drenched by a sudden rain storm.

It is one of the objects of the present invention to overcome the above-mentioned disadvantages of the ordinary rumble seat by providing an inclosure therefore which may be readily collapsed and closed up with said rumble seat.

A further object of this invention is to provide a collapsible inclosure for rumble seats, which, when in collapsed condition, will occupy a comparatively small space.

It is a more specific object of this invention to provide an inclosure for rumble seats, all parts of which, when collapsed, are adapted to fit within a narrow compartment between the seat cushion and the rumble seat closure member.

A further object of this invention is to provide a collapsible inclosure for rumble seats which is simple in construction, neat in appearance, and well adapted for the purpose described.

With the above and other objects in view, the invention consists of the improved collapsible inclosure for rumble seats and all its parts and combinations, as set forth in the claims, and all equivalents thereof.

In the accompanying drawings, in which the same reference characters designate the same parts in all of the views:

Fig. 1 is a perspective view of an automobile having a rumble seat equipped with the improved inclosure;

Fig. 2 is a perspective view of the rumble seat closure member alone, showing the various parts of the inclosure in collapsed position, parts being broken away, and the dotted lines indicating the assembled position of the collapsible frame members;

Fig. 3 is a similar view, showing the inclosure in partially assembled condition;

Fig. 4 is a perspective view of the rear portion of an automobile, showing the rumble seat inclosure in fully assembled condition;

Fig. 5 is an enlarged detail plan view of one of the frame bracket members, the frame member passing therethrough being shown in section;

Fig. 6 is an enlarged detail front view of one of the frame members and its supporting brackets, parts being broken away;

Fig. 7 is an enlarged detail view showing the means for detachably connecting the ends of the frame members, parts being broken away; and Fig. 8 is an enlarged sectional view taken on line 8—8 of Fig. 3.

Referring to the drawings, the numeral 10 designates an automobile having a rumble seat opening 11 and having a rumble seat closure member 12 pivoted adjacent the rear of the opening in the usual manner. A rear cushion 13, for the rumble seat, is spaced from the inside of the closure member 12 to form a compartment 14 therebetween. The sides of said compartment are closed by side pieces 15, which are shaped to conform to the curvature of the closure member. The said side pieces are permanently secured in position in any suitable manner.

Angle brackets 16 and 17 are secured to the inner side of each of the side pieces 15 and extend inwardly therefrom. The inwardly extending portion of each bracket 16 is provided with a central opening 18 and with a slot 19 extending from said opening. The inwardly extending portion of each bracket 17 is provided with an oval opening 20.

L-shaped frame members 21 extend through the openings of the brackets 16 and 17. The said frame members have their lower ends curved as at 22, and to the other end of each of said members a front frame member 23 is hingedly secured as at 24. One of the front frame members has a flattened end portion 25 which is provided with openings 26. The other front frame member has a bifurcated end portion 27 within which the portion 25 is adapted to fit. The bifurcated portion 27 has openings 28 therein, which are arranged to register with the openings 26. Brackets 29, depending from the frame portion 27, carry slidable latches 30 which are adapted to pass through the openings 26 and 28 to removably hold the front frame members together. Coil springs 31, surrounding the latches, are positioned between collars 32 and the lower portion of the brackets, to normally hold the latches in engaging position. Each of the frame members 21 is also provided with laterally extending pins 33 and 34 (see Fig. 6). A cover 35 is hinged as at 36 to the upper edge of the rumble seat closure member 12, and is adapted to close the compartment 14.

A covering 37 is arranged to extend over the top and rear of the frame members, as shown in Fig. 3, the lower edge of the rear of said covering being provided with fasteners 38 for engaging complementary fasteners 39 on the hinged cover member 35. Said lower edge of the covering extends on both sides of the member 35, as shown in Fig. 8, to provide a watertight closure. The rear portion of said cover is provided with a window 40. A strap 40' reinforces the rear edge of the top and another strap 40'' the front portion.

Side curtains 41 are arranged to connect with the lower edge of the cover as at 42, and with the rear of the rumble seat as at 43. The lower edge of each side curtain is provided with metallic reinforcing bands 44 which curve outwardly to hold the lower edge firmly against the body of the vehicle. Each side curtain is formed with a window 45.

A front curtain 46 is adapted to be secured to the front edge of the cover as at 47, and to the side curtains as at 48. The lower edge of the front curtain is also provided with curved metal bands 49, and with a window 50.

When the curtains are in the folded up position shown in Fig. 2, they fit within straps 51. By pulling upwardly on the free ends of said straps, the curtains may be readily removed from the compartment. Short straps 52 facilitate the removal of the frame members 21.

To assemble the inclosure, the frame members 21 are pulled upwardly by the straps 52 until said frame members can be gripped by the hands. They are then raised upwardly until the pin 33 on each member passes through the slot 19 of the bracket 16. Next, each frame member is swung outwardly to the position shown by the dotted lines in Fig. 2, it being held firmly in position by the brackets and by the pins 33 and 34 engaging each side of the upper bracket. The front frame members 23 are then swung toward one another, and the latches 30 are manipulated to lock the adjacent ends together, as shown in Fig. 7. Next, the cover and curtains are withdrawn from the compartment 14 and are assembled as before described. To collapse the top, the reverse operation is performed and the cover 35 of the compartment 14 is closed. The rumble seat will then have the usual appearance, and may be closed up in the usual manner.

From the foregoing description it may be seen that a novel form of inclosure has been provided which is adapted to be very easily assembled and collapsed, and which, when collapsed, is arranged to fit in a compact space so that there is no interference with the ordinary use or with the closing up of the rumble seat.

Although only one form of the inclosure has been shown and described, it is obvious that various modifications may be made without departing from the spirit of the invention, and it is to be understood that all such changes are contemplated as may fairly come within the scope of the claims. It is further to be understood that the said collapsible inclosure, while more particularly designed for use in connection with rumble seats, is nevertheless capable of other adaptations.

What I claim is:

1. The combination with an automobile having a rumble seat with a closure member therefor, said closure member being formed with a compartment therein, of a collapsible inclosure for said rumble seat, comprising a pair of frame members, perforated brackets extending from said closure member within said compartment, said frame members being slidably and pivotally positioned in the perforations of said brackets said perforations in the brackets being of such shape as to provide for passage of the locking means therethrough when the upper portions of the frame members are parallel to the closure members and to prevent passage therethrough when the upper portions of the frame members are at right angles to the closure member, locking means on said frame members, for releasably holding the frame members in a raised pivoted position, and a removable covering for said frame members, said frame members being movable from said raised position to a lowered collapsed position within said compartment, and said compartment being adapted to accommodate said removable covering.

2. The combination with an automobile having a rumble seat with a closure member therefor, said closure member being formed with a compartment therein, of a collapsible inclosure for said rumble seat, comprising a pair of frame members, perforated brackets extending from said closure member within said compartment, said frame members being slidably and pivotally positioned in the perforations of said brackets, locking means on said frame members, said perforations in the brackets being of such shape as to provide for passage of the locking means therethrough when the upper portions of the frame members are parallel to the closure member and to prevent passage therethrough when the upper portions of the frame members are at right angles to the closure member for releasably holding the frame members in a raised pivoted position, and a removable covering for said frame members, said frame members being movable from said raised position to a lowered collapsed position within said compartment.

In testimony whereof, I affix my signature.

FREDERICK E. HARTMAN.